April 11, 1961 W. BECKER ET AL 2,979,184
CONVEYOR TRAINS
Filed Sept. 19, 1957 4 Sheets-Sheet 1

April 11, 1961  W. BECKER ET AL  2,979,184
CONVEYOR TRAINS
Filed Sept. 19, 1957  4 Sheets-Sheet 3

INVENTORS
Wilhelm Becker
Fritz Schweissmaier
Karl Féja
Wilhelm Schuster
by Malcolm W. Fraser
attorney

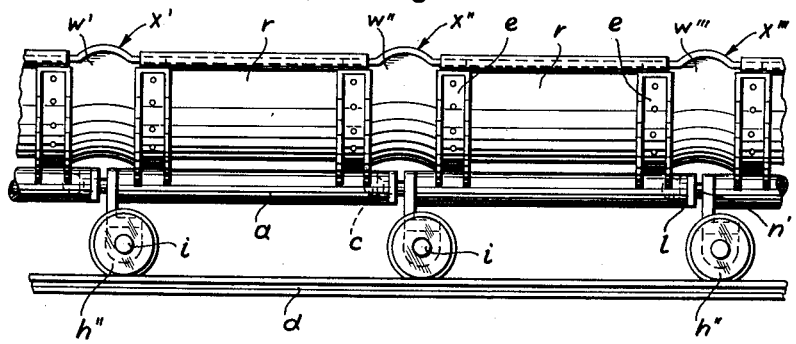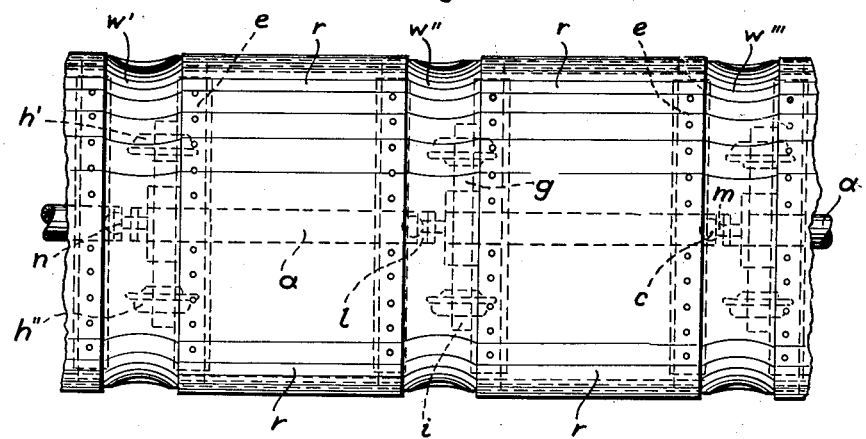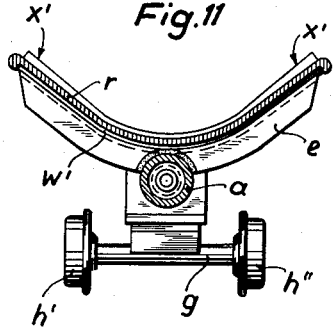

United States Patent Office 2,979,184
Patented Apr. 11, 1961

2,979,184

CONVEYOR TRAINS

Wilhelm Becker, Fritz Schmeissmeier, and Karl Feja, Recklinghausen, and Wilhelm Schuster, Munich, Germany Filed Sept. 19, 1957, Ser. No. 685,012

Claims priority, application Germany Sept. 26, 1956

1 Claim. (Cl. 198—109)

The invention relates to conveyor means for transporting any type of bulk material, especially such that can be heaped, for use for instance in underground and opencast workings, quarries, sand pits, and other industrial plants.

In view of the fact that comparatively high capital and operational expenditure is entailed in bridging major distances by means of an endless conveyor such as a steel chain, conveyor means based on the principle of trolley conveyor train sets, described for instance as bunker trains and belt trains, have been developed in recent years to save a major part of the cost of providing and driving a continuous strand.

These bunker trains, which in effect consist of a number of individual trolleys, have not been adopted to any considerable extent especially since the discharge of such cars by means of an additional conveyor means on the floor of the coupled set of trolleys creates difficulties and leads to structural complications which largely nullify the saving in cost, apart from the fact that the necessary linearity of the secondary conveyor means in the form of a belt considerably reduces the ability of such bunker trains to negotiate curves.

Despite the greater advantages offered by belt trains, their applicability is nevertheless very limited and their provision also calls for considerable financial expenditure and technical skill in providing a supporting frame and the drive means. Moreover, belt trains cannot transport heavy and bulky materials, so that in underground workings the necessity often arises of having to provide additional mine car transportation in the main roads to permit such materials to be conveyed.

The present invention contemplates the provision of conveyor means constructed in the manner of a conveyor train set, but combining the advantages of known forms of conveyor which work on this principle without at the same time suffering from their inherent drawbacks, that is to say conveyor means which can be used in conjunction with any type of haulage means, preferably a locomotive or a cable drum and cable, and which can be operated over any desired distance on a simple type of rail track and can negotiate curves, hollows or humps without difficulty. The conveyor train of the present invention can also be used in conjunction with haulage means which consist of an endless chain or a sequence of endless chains or intermediate drive means operating on an analogous principle, though the simplification arising in the first mentioned cases by the possibility of using a normal rail track must then be abandoned.

The conveyor train according to the present invention consists of an arbitrary number of two-wheeled undercarriage units which are flexibly interconnected by means of a shaft extending at right angles from the centre of the wheel axle and rigidly connected therewith, so that the consecutive wheel sets guide one another along the rail track.

According to a feature of the invention the coupling means for interconnecting consecutive undercarriage units consist in ball and socket or like universal joints between the free end of each shaft and the preceding undercarriage unit to permit the shaft to be pivotally deflectable both about a vertical axis and its horizontal longitudinal axis.

The shaft of the first of the undercarriage units in the train set is similarly flexibly joined to a four-wheeled and hence self-supporting leading carriage of which the axles are positively coupled in parallel.

In the event of a haulage cable being employed, the latter is attached to the leading undercarriage.

Mounted on the shafts of the undercarriage units are transverse supports which carry the trough for the reception of the conveyed material. In one embodiment of the invention the trough is a continuous, uninterrupted, trough-shaped cover consisting of rubber or other elastic material carried on transverse supports arranged to pivot within limits in the lateral direction about king pins on the shafts of the undercarriage units so that the relative movements in the various directions which are liable to occur between different sections of the trough and the undercarriage units are in no way impeded, and more particularly the trough can be torsionally twisted about its longitudinal centre line. This facility is required not only for the purpose of enabling the conveyor train to run over elevated sections of track but also and more particularly to enable such train to be automatically unloaded by laterally canting the trough in a suitably elevated section of track at the unloading station.

In another modification of the invention the transverse supports which are themselves concavely arched to define a trough outline, are rigidly secured to the shafts and carry individual trough sections made of steel sheet or some material of similar properties, the trough sections being hingeably attached to the transverse supports for instance on the inside thereof, so that the other side, when running over an elevated track section, for instance at a tipping dump or unloading station, can be hingeably raised for discharging the conveyed material. In such an embodiment the individual trough sections must overlap so that the conveyed material cannot fall between them.

In one form of construction this result is achieved by providing a sufficient degree of overlap between adjoining trough sections that a gap will not arise between them in curves or canted track sections. Overlap can be in the manner of fish scales as is conventional in steel section apron conveyors, but in a preferred form of construction both ends of each section are arranged to extend either over or under the neighbouring section so that each alternate section will be overlapped by the edges of both its neighbouring sections and the overlapped section is arranged to raise both its neighbours from their supporting rungs and to tilt them about their respective hinges, for instance when passing over elevations, and afterwards automatically to deposit them again on their supports when the elevated section ends.

In a particularly advantageous embodiment of the invention, which is especially well adapted to satisfy the basic purpose contemplated by the invention, namely to provide conveyor means of the simplest construction suitable for the greatest number of applications without being liable to cause trouble in operation and which even permits the general construction of the conveyor to be even further simplified, intermediate, trough-shaped, elastic intermediate sections are provided and securely attached to the rigid trough sections or to the last of the rungs which carry the rigid trough sections. Preferably these intermediate sections are wider than the distance between the ends of the steel sheet troughs so that they will form folds which, at curves and elevated track sections, can stretch and which, more particularly, allow sections of the conveyor train to be sufficiently laterally canted in relation to others to permit the side discharge of the load.

Preferably the intermediate sections are detachably secured in the gap between the ends of the sheet steel troughs and the terminal rungs. This manner of attaching the intermediate sections will at the same time create an elastic cushioning layer between the sheet steel troughs and the rungs as a result of which the moving undercarriage units will run with less noise.

According to yet another feature of the invention the individual sheet steel trough sections are designed to be sufficiently strong to enable them to take the loads otherwise supported by the shaft which extend from the axle to the ball and socket joint, thus permitting the shafts to be dispensed with altogether and the front of the undercarriage to be provided merely with a short stub without a rung which is connected by a simple flexible member such as a chain with a second short stub likewise carrying a rung and pivotally mounted in the ball and socket joint. If the troughs are suitably shaped even the chain connecting the stubs may be omitted and the connection between the undercarriage units effected solely by the trough sections themselves.

The invention will be further described with reference to the accompanying drawings which show a number of illustrative embodiments of the novel conveyor means and in which.

Figure 1:
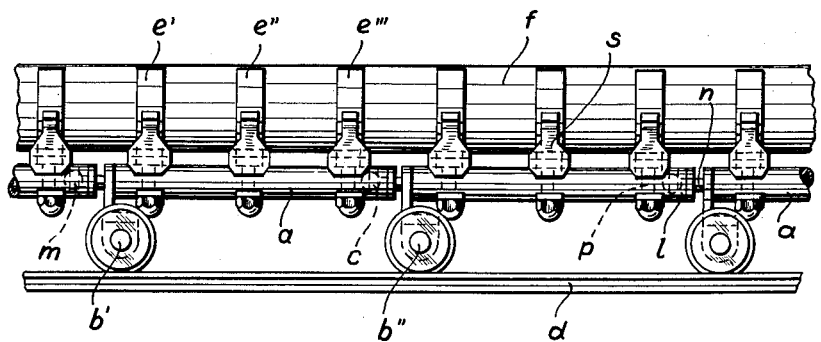
Figure 1 is a partial side view of conveyor means comprising a continuous trough consisting of an elastic material.
Figure 2:
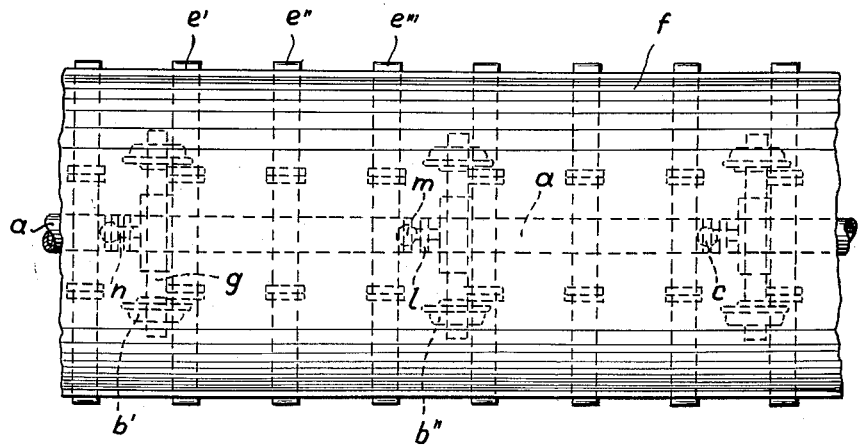
Fig. 2 is a top plan view of the conveyor means shown in Figure 1.
Figure 3:
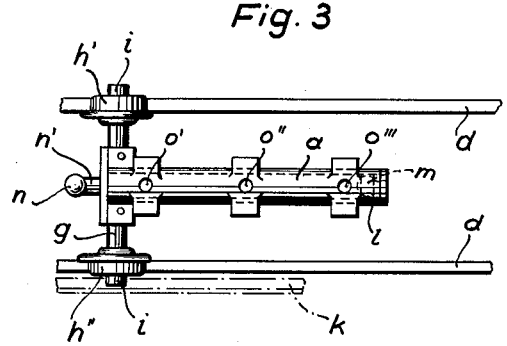
Figures 3 and 4 are a top plan view and side view respectively of an individual unit of the conveyor means shown in Figures 1 and 2, the trough being omitted.
Figure 4:
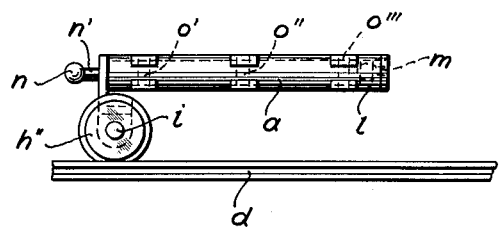
Figure 5:
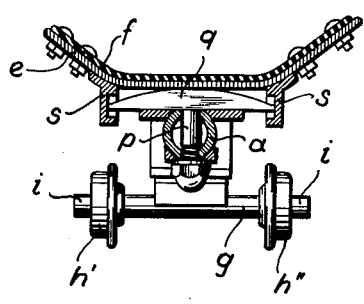
Figures 5 to 7 are vertical sectional views of the conveyor means disclosing different constructions relating to the arrangement of the troughs on the undercarriage units.

Figures 1 and 2 represent the basic construction of the individual undercarriage units and leave out all secondary features which are not essential to an understanding of the main features of the invention, the said undercarriage units comprising a shaft $a$ supported by a set of running wheels $b'$ and connected by means of a ball and socket joint with the set of running wheels $b''$ of the following undercarriage unit, the wheels running on a rail track $d$. The shafts $a$ carry transverse rungs $e'$, $e''$, $e'''$ which are concavely arched to define the general shape of a trough. The rungs of the whole series of undercarriage units support a continuous trough-shaped cover $f$ consisting of an elastic material e.g. rubber.

Various possible modified forms of construction of the undercarriage units and of the trough for carrying the conveyed material are shown in Figures 3 to 7.

The axle $g$ of each undercarriage unit carries a set of wheels spaced in conformity with the gauge of the track and preferably in the form of normal trolley wheels $h'$, $h''$ with inside flanges.

In the illustrated embodiment hubs $i$ are arranged to project for the purpose of engaging U-section rails $k$ provided in addition to or in place of the normal rail in track sections where it is desired to tilt axially the relative undercarriage unit or to twist axially a section of the train set for the purpose of discharging the same, the said U-section rails being appropriately helically twisted. These simple guide means obviate the need to provide very expensive and complicated additional guide means along the track sections in question. The shaft $a$ is rigidly attached to the centre of the axle $g$ and extends at a right angle thereto substantially horizontally.

The free end $l$ of the shaft contains the socket $m$ of a ball and socket joint or the female element of some other form of universal joint. The cooperating member $n$ of the ball and socket joint is formed at the end of a pin $n'$ which projects, preferably rigidly, from the rear side of the axle $g$.

The method of coupling the undercarriage units together by means of these joints $m$, $n$ provides an articulation which permits consecutive undercarriage units to move independently in any desired direction and plane.

Preferably the shaft $a$ is longer than the axle $g$ which will therefore always remain approximately at right angles to the supporting rails, so that there is no risk of the running wheels guided by their flanges along the rails being forced off the rails. The individual undercarriage unit may be of any length within the limits of what would be practicable.

The attachment of the shaft of the first pair of running wheels in the set to a supporting, twin-axle, leading carriage is not shown in the drawings. To permit the negotiation of canted track sections this leading carriage must also be of flexible construction, that is to say its two sets of wheels must be relatively displaceable in vertical planes.

At suitable intervals the shaft $a$ is provided with vertically drilled holes $o'$, $o''$ . . . in which the king pins of cradles $q$ are rotatable and secured against being withdrawn. The rungs $e$ are placed on the cradles and retained laterally by limiting or retaining pockets $s$ so that they can move at right angles to the shaft on the cradles and at the same time rock within the limits of play determined by the size of the pockets. Normally, when the weight is evenly distributed, the rungs will be in a central and horizontal position.

When the train set runs through a curve the shafts of consecutive undercarriage units will define adjacent sides of a polygon. If in the embodiments shown in Figures 1 to 5 the rungs were rigidly attached to the shafts the trough-shaped cover would be pressed together on the inside of a curved section and stretched on the outside thereof.

Owing to the pivotal mounting of the rung cradles on the shafts and the lateral deflectability of the rungs on the cradles, compression and elongation of the elastic trough-shaped cover can be evenly distributed and the cover can assume a uniformly curved shape.

At the same time the construction described permits sections of the train to be canted at unloading points by the elevation of one of the running rails or of the guide rails until the trough is substantially in a vertical position, catch rails being provided to hold the section in question on the canted track.

Figure 6:
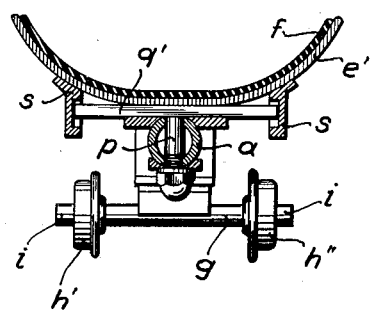

In the embodiment shown in Figure 6 the rung cradle $q'$ has a flat upper surface and the rung $e'$ is convexly arched towards the cradle.

One of the rungs, preferably that located on the shaft above the set of running wheels, is rigidly fixed by the interposed cradle and at this point the trough is therefore positively coupled with the undercarriage unit.

The continuous elastic trough-shaped cover $f$ shown in Figures 1 to 6 may be attached to the rungs $e$ by any suitable means such as screws, rivets or clamps, and there is no need to make provision for relative movement between the elastic cover and the rungs.

Figure 7:
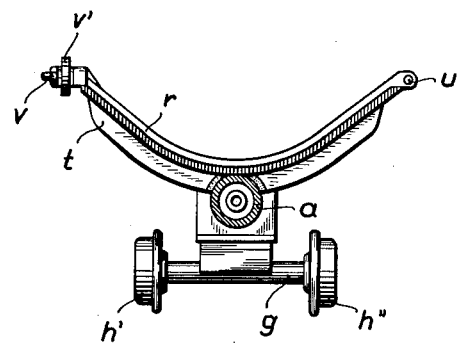

In the embodiment illustrated in Figure 7 the individual undercarriage units, unlike the forms of construction that have been described, are not arranged to carry a trough-shaped cover of elastic material extending the length of the entire set, but are surrounded by trough sections $r$ made of an inelastic material, preferably steel sheet. These are placed into the concavity of the arched rungs *t* which are rigidly secured to the shaft *a* at suitable intervals, as in the first described embodiment.

On that side of the conveyor set towards which the conveyed material is to be discharged the rungs *t* and trough sections *r* are connected by means of hinges *u* which permit the troughs to be pivotally raised from the rungs.

On the opposite side of the conveyor each trough section carries an outward extension *v* which may carry a roller *v'* adapted to ride on to a guide rail at the unloading station and thereby to raise the trough sections on their hinges *u* sufficiently to discharge the conveyed material. This form of construction permits the joint between consecutive shafted undercarriage units to be of a simplified type, but it also necessitates overlap between the trough sections to prevent any of the conveyed material from falling through.

Figure 8:
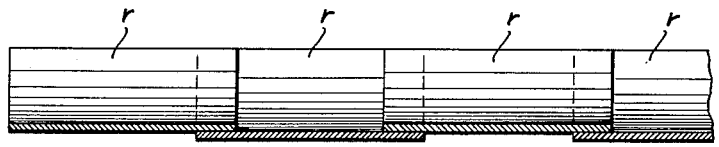
Figure 8 is a diagrammatic view showing an alternative way of forming the overlapping joint between adjacent trough sections in the embodiment according to Figure 7, and Figures 9 to 11 are a side view, a top plan view, and a cross section respectively of a conveyor means where the connection between consecutive troughs is by means of elastic trough-shaped intermediate members.

A different type of overlap is diagrammatically illustrated in Figure 8.

In Figure 8 in which each alternate trough section extends underneath the ends of the two adjacent trough sections, three trough sections are raised together by the guide rail at the unloading station and subsequently replaced on the rungs when the train has passed the station. In other words, the train can travel through the unloading station without stopping.

In a particularly advantageous embodiment of the novel conveyor means which is illustrated in Figures 9 and 11 the construction of the undercarriage units and their interconnection by ball and socket or other universal joints between the undercarriage shafts is similar to that already described, more particularly to that used in conjunction with steel or sheet iron trough sections on each of the undercarriages.

However, unlike the form of construction described with reference to Figures 7 and 8, the connection between the trough sections *r*, which are placed on to the rungs and rigidly though detachably connected therewith, is effected by means of intermediate, trough-shaped sections *w'*, *w''*, *w'''* consisting of rubber or the like and having side walls which are wider than the actual distance between the opposed ends of the sheet metal trough sections.

As a result of this formation of the intermediate sections, transverse folds *x'*, *x''*, *x'''* will form in the side walls, as clearly shown in Figure 11, and these folds can then stretch as may be required when the train set runs through curves or enters a canted track section, and no tensile stresses will be created or transmitted to the undercarriage units.

The detachable connection of the elastic intermediate sections *w* with the rigid metal sections is preferably effected by pushing the ends of the intermediate sections into the gap formed between the end rungs *e* and the sheet steel trough sections (Figure 11).

The conveyor means according to the invention may be composed of any desired number of undercarriage units according to the particular requirements of the individual case. As has already been mentioned the set can be adapted to run on standard rail tracks such as mine car rails, and it can be hauled by any desired special haulage means, or it may be self-propelled, for instance by contriving the two-axle leading carriage to which the shaft of the leading two-wheeled undercarriage unit is attached to serve as a locomotive.

We claim:

A conveyor train consisting of a plurality of under carriage units each having a single horizontally disposed axle; track engaging wheel means rotatably mounted on said axle at opposed terminal ends thereof; a shaft extending forwardly from the middle portion of said axle; one element of a universal type coupling on the forward end of said shaft; a member extending rearwardly from said shaft at the middle portion of said axle, said member being provided with an element of a universal type coupling adapted to cooperate with an element of a universal type coupling on the forward end of the shaft of the following under carriage unit thereby to enable each of said units to be interconnected in end to end relationship through said universal couplings; material supporting means comprising at least one transversely disposed concavely arched rung means rigidly connected to the shaft of each of said under carriage units; a trough-like section of rigid sheet material mounted on said arched rung means and extending a substantial portion of the axial length of said shaft whereby the load of material carried by the conveyor train is transmitted to the wheel means through said shaft; and resilient sheet material of a transverse cross-section similar to and coextensive with said trough-like sections at the juncture of said material and said trough-like sections and interconnecting the forward edge of each of said trough-like sections with the trailing edge of each of said trough-like sections immediately in advance thereof, said material being of greater length than the interval between adjacent trough-like sections.

References Cited in the file of this patent

UNITED STATES PATENTS

| 2,594,342 | Pettyjohn | Apr. 29, 1952 |
| 2,753,983 | Bloomer | July 10, 1956 |
| 2,850,149 | Bankauf | Sept. 2, 1958 |
| 2,855,092 | Beech | Oct. 7, 1958 |

FOREIGN PATENTS

| 462,517 | Canada | Jan. 17, 1950 |
| 735,336 | Great Britain | Aug. 17, 1955 |
| 1,014,507 | France | June 18, 1952 |